United States Patent [19]
Takada et al.

[11] Patent Number: 6,055,954
[45] Date of Patent: May 2, 2000

[54] SPARK IGNITION TYPE INTERNAL COMBUSTION ENGINE WITH SUB-COMBUSTION CHAMBER

[75] Inventors: Yoshihiro Takada; Yuji Tsushima; Shunji Akamatsu; Yutaka Nishikawa, all of Saitama, Japan

[73] Assignee: Honda Giken Kogyo Kabushiki Kaisha, Tokyo, Japan

[21] Appl. No.: 09/081,594

[22] Filed: May 20, 1998

[30] Foreign Application Priority Data

May 20, 1997 [JP] Japan ................................. 9-130118

[51] Int. Cl.$^7$ ..................................................... F02B 75/02
[52] U.S. Cl. ........................... 123/257; 123/280; 123/285; 123/287
[58] Field of Search .................... 123/257, 260, 123/274, 280, 285, 287

[56] References Cited

U.S. PATENT DOCUMENTS

| | | | |
|---|---|---|---|
| 1,719,705 | 7/1929 | Kondo | 123/287 |
| 1,758,460 | 5/1930 | Oberhaensli | 123/280 |
| 3,113,561 | 12/1963 | Heintz | 123/257 |
| 4,186,692 | 2/1980 | Kawamura et al. | 123/280 |
| 4,323,039 | 4/1982 | Tsugekawa et al. | 123/280 |
| 5,085,189 | 2/1992 | Huang et al. | 123/257 |

FOREIGN PATENT DOCUMENTS 47-43368  11/1972  Japan .

*Primary Examiner*—Wiiis R. Wolfe
*Attorney, Agent, or Firm*—Birch, Stewart, Kolasch & Birch, LLP

[57] ABSTRACT

A spark ignition internal combustion engine includes a sub-combustion chamber in which gas mixture with an air-fuel ratio adapted for an operating state of the engine over a wide operating range of the engine is supplied to a combustion chamber. The amount of hydrogen carbide discharged is less and a high efficiency can be attained. The sub-combustion chamber of the internal combustion engine communicates with the main combustion chamber. Gas mixture injecting apparatus intermittently injects gas mixture into the sub-combustion chamber. Ignition devices are arranged in the sub-combustion chamber. The engine is constructed such that the sub-combustion chamber is eccentric in a sideward direction from an extending line of injecting direction of the gas mixture injecting apparatus and communicated with the main combustion chamber. The gas mixture injecting apparatus includes a pressure accumulating chamber adjacent to the sub-combustion chamber and to which pressure air is filled, the opening or closing valve to cause the pressure accumulating chamber to be communicated with the sub-combustion chamber in such a way that they may be opened or closed, and the fuel injecting valve for injecting fuel to the pressure accumulating chamber.

18 Claims, 11 Drawing Sheets

SPARK IGNITION TYPE INTERNAL COMBUSTION ENGINE WITH SUB-COMBUSTION CHAMBER

BACKGROUND OF THE INVENTION

1. Field of the Invention

This invention relates to a spark ignition internal combustion engine having a sub-combustion chamber into which a gas mixture is supplied. The gas mixture has an air-fuel ratio adapted for an engine operating state over a wide operating range of the engine. In the present invention, the engine has a high operating efficiency, and an amount of hydrogen carbide discharged is lowered.

2. Description of the Background Art

A spark ignition internal combustion engine is known in which supplied gas is formed in a layer within a combustion chamber from a rich gas mixture to a lean gas mixture under a low load operation state of the engine. The rich gas mixture is ignited by a spark plug, and the gas mixture with an average lean air-fuel ratio is completely ignited in such a way that no unignited gas is produced (refer to a gazette of Japanese Patent Publication No. Sho 47-43368).

In the internal combustion engine described in the above gazette, a pressure accumulating chamber filled with pressurized air, a sub-combustion chamber, a main combustion chamber, a communicating opening to cause both sub-combustion chamber and main combustion chamber to be communicated to each other, and a poppet valve communicating the pressure accumulating chamber and the sub-combustion chamber in such a way that they may be opened or closed are arranged in a straight line. In this way, gas mixture in the pressure accumulating chamber is injected into the sub-combustion chamber through the poppet valve released near a top dead center point of a piston.

The internal combustion engine described in the gazette of Japanese Patent Publication No. Sho 47-43368 has a disadvantage that combustion gas within the sub-combustion chamber does not generate any eddy flow, but may easily be stayed. Scavenging is not carried out sufficiently under a more uniform combustion state in a high load operation range than a laminated combustion state in the low load operation range. In particular, the gas mixture becomes non-uniform and a desired high output is hardly attained due to the fact that a communicating opening communicating the sub-combustion chamber with the main combustion chamber and a central part of the sub-combustion chamber are arranged on a central extended line of the poppet valve.

In addition, the sub-combustion chamber was formed into a substantial cylindrical shape, and fuel in the gas mixture was injected from the poppet valve into the sub-combustion chamber in a substantial cylindrical form in a conical shape opening outwardly from the opening of the poppet valve. Thus, the gas mixture might adhere to the wall surface of the sub-combustion chamber to produce soot in an easy manner. Further, the gas mixture was not sufficiently contacted with the electrode of the spark plug, thereby producing an irregular ignition.

SUMMARY OF THE INVENTION

The present invention relates to an improvement of the spark ignition internal combustion engine having a sub-combustion chamber overcoming such disadvantages as described above. The engine includes a sub-combustion chamber communicated with a main combustion chamber, gas mixture injecting means for injecting gas mixture directly and intermittently into the sub-combustion chamber, and igniting means arranged in the sub-combustion chamber. The sub-combustion chamber is communicated with the main combustion chamber eccentrically displaced from an extended line of an injecting direction of the gas mixture injecting means.

The present invention is constructed as described above, so that the gas mixture injected from the gas mixture injecting means is not agitated by gas flow from within the main combustion chamber, but formed into a laminated flow from rich gas mixture to lean gas mixture. The gas mixture is positively ignited at the electrode of the spark plug where the rich gas mixture is present, and at the same time, its flame is transmitted to the lean gas mixture. The supplied gas entirely kept in lean state can be ignited easily and positively and then occurrence of hydrogen carbide is sufficiently restricted.

In a high load operation range, the gas mixture within the sub-combustion chamber is abruptly increased, and strikes against the scavenging flow entering from within the main combustion chamber into the sub-combustion chamber. At the same time, an eddy flow is generated under an eccentric state of each of a flow of gas mixture injected from the gas mixture injecting means and the scavenging flow entered from the communicating opening between the main combustion chamber and the sub-combustion chamber into the sub-combustion chamber. The gas mixture and the scavenging gas are uniformly mixed, Relatively rich supplying gas can be ignited stably and positively, and a high output may easily be attained. Then, no special component element is required and a desired performance can be attained at low cost.

The invention makes it possible to perform an easy injection of the gas mixture through the gas mixture injecting means within the sub-combustion chamber overcoming a pressure in the sub-combustion chamber at the injection time of the gas mixture. The gas mixture can be uniformly injected into the sub-combustion chamber in a conical shape at a desired timing. The gas mixture injected from the gas mixture injecting means can be dispersed into the sub-combustion chamber without adhering to the wall surface of the sub-combustion chamber.

The gas mixture injected into the sub-combustion chamber and supplied to the main combustion-chamber is applied with a directional characteristic, resulting in that a blowing-off of the gas mixture through the exhaust port or the exhaust valve can be prevented. At the same time, the eccentric opening structure can be easily formed, the gas mixture injected from the gas mixture injecting means can be directed to the igniting means so as to perform a stable combustion.

In addition, the gas mixture injected from the gas mixture injecting means into the sub-combustion chamber and struck against the striking wall can be guided smoothly to the communicating opening between the sub-combustion chamber and the main combustion chamber, and then supplied into the main combustion chamber.

Additionally, the gas mixture injected from the gas mixture injecting means is struck against the striking wall without locally adhering to the wall surface of the sub-combustion chamber in a large amount, thereafter the gas mixture can be supplied smoothly from the communicating opening between the sub-combustion chamber and the main combustion chamber into the main combustion chamber. At the same time, the gas mixture can be contacted with the electrode of the spark plug as much as possible and ignited positively.

It is possible to generate eddy flow in the gas mixture within the main combustion chamber along a central line of the cylinder bore and to attain a superior combustion state. It is also possible to apply the invention to the 2-stroke cycle internal combustion engine, or 2-cycle internal combustion engine, where a blowing-off of the gas may easily be produced, to reduce a discharging amount of hydrogen carbide contained in the exhaust gas and at the same time to improve its output as well as its efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
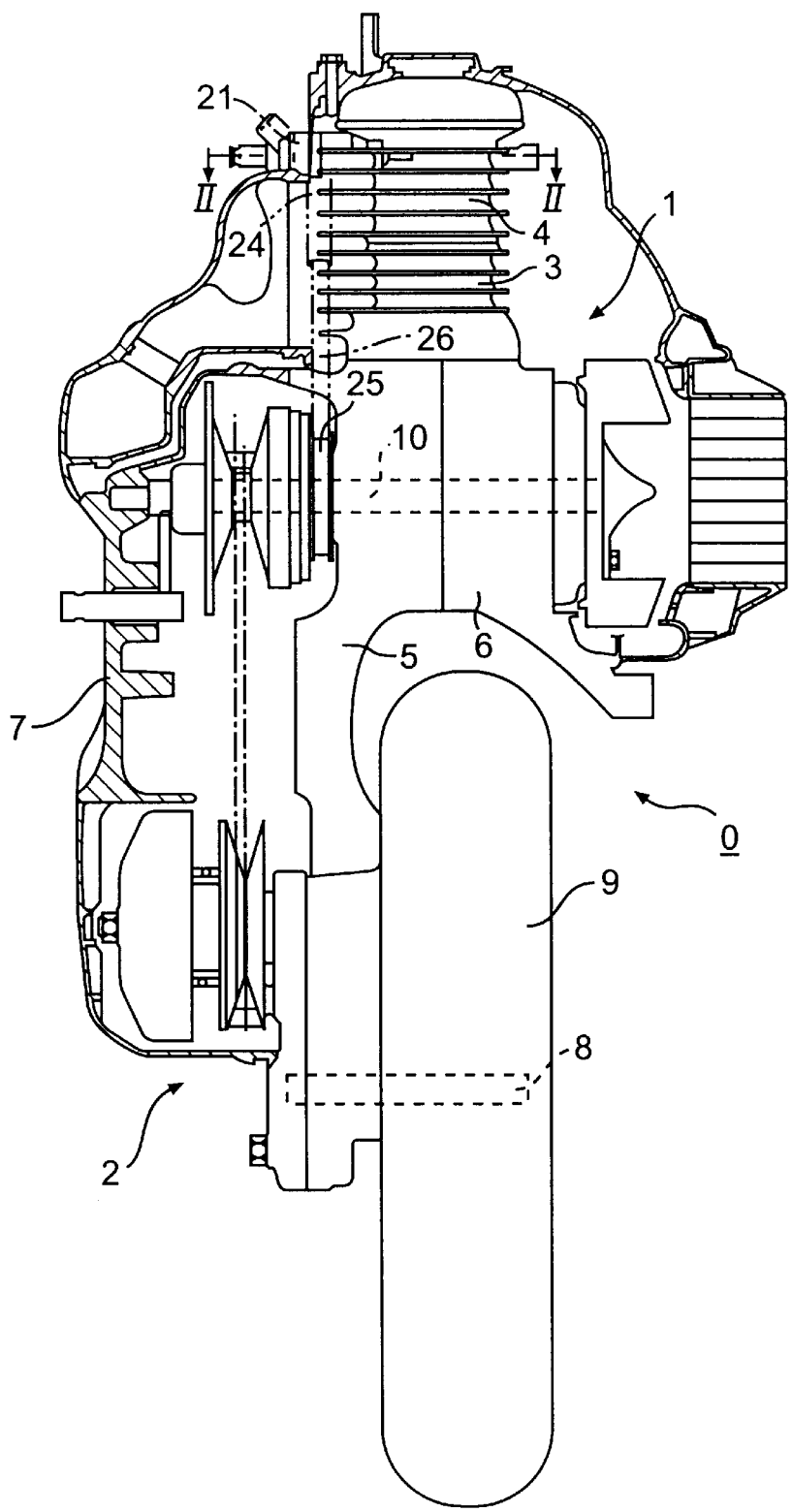
FIG. 1 is a schematic top plan view showing a preferred embodiment of a spark ignition 2-cycle internal combustion engine having a sub-combustion chamber of the present invention.

A preferred embodiment of the present invention will now be described with reference to FIGS. 1 to 4. A spark ignition 2-cycle internal combustion engine 1 having a sub-combustion chamber is integrally assembled into a swing power unit O for a scooter type motorcycle (not shown) together with a V-belt continuously variable transmission 2.

A cylinder head 4 is integrally connected to the upper part of a cylinder block 3 of the spark ignition 2-cycle internal combustion engine 1. A left crankcase 5 and a right crankcase 6 are divided into right and left sections and are integrally connected to the lower part of the cylinder block 3.

The left crankcase 5 is extended in a rearward direction, and a transmission case 7 is removably connected at the left outer side of the left crankcase 5. Together, the transmission case 7 and the left crankcase 5 form a case for the V-belt continuously variable transmission 2. A rear wheel 9 is integrally fixed to a wheel shaft 8 acting as an output shaft of the V-belt continuously variable transmission 2. A crankshaft 10 is rotatably supported by the left crankcase 5 and the right crankcase 6. Power from the crankshaft 10 is transmitted to the rear wheel 9 through the V-belt continuously variable transmission 2.

Figure 3:
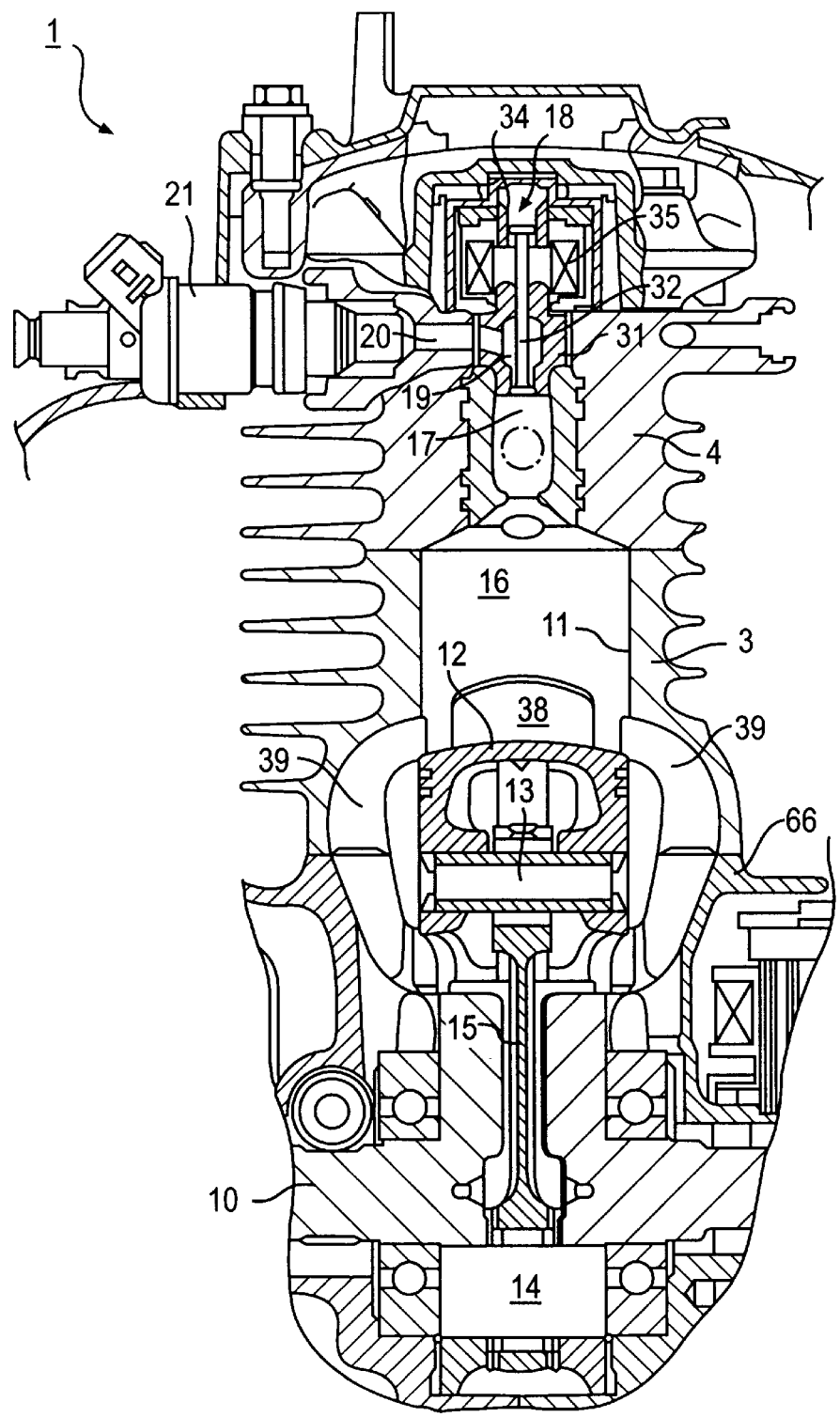
FIG. 3 is a rear view in longitudinal section taken along line III—III of FIG. 2.

As shown in FIG. 3, a piston 12 is slidably fitted into a cylinder bore 11 of the cylinder block 3 in the spark ignition 2-cycle internal combustion engine 1. Both ends of a connecting rod 15 are rotatably pivoted to a piston pin 13 of the piston 12 and a crank pin 14 of the crankshaft 10. The crankshaft 10 is rotatably driven as the piston 12 ascends or descends within the cylinder bore 11.

Figure 4:
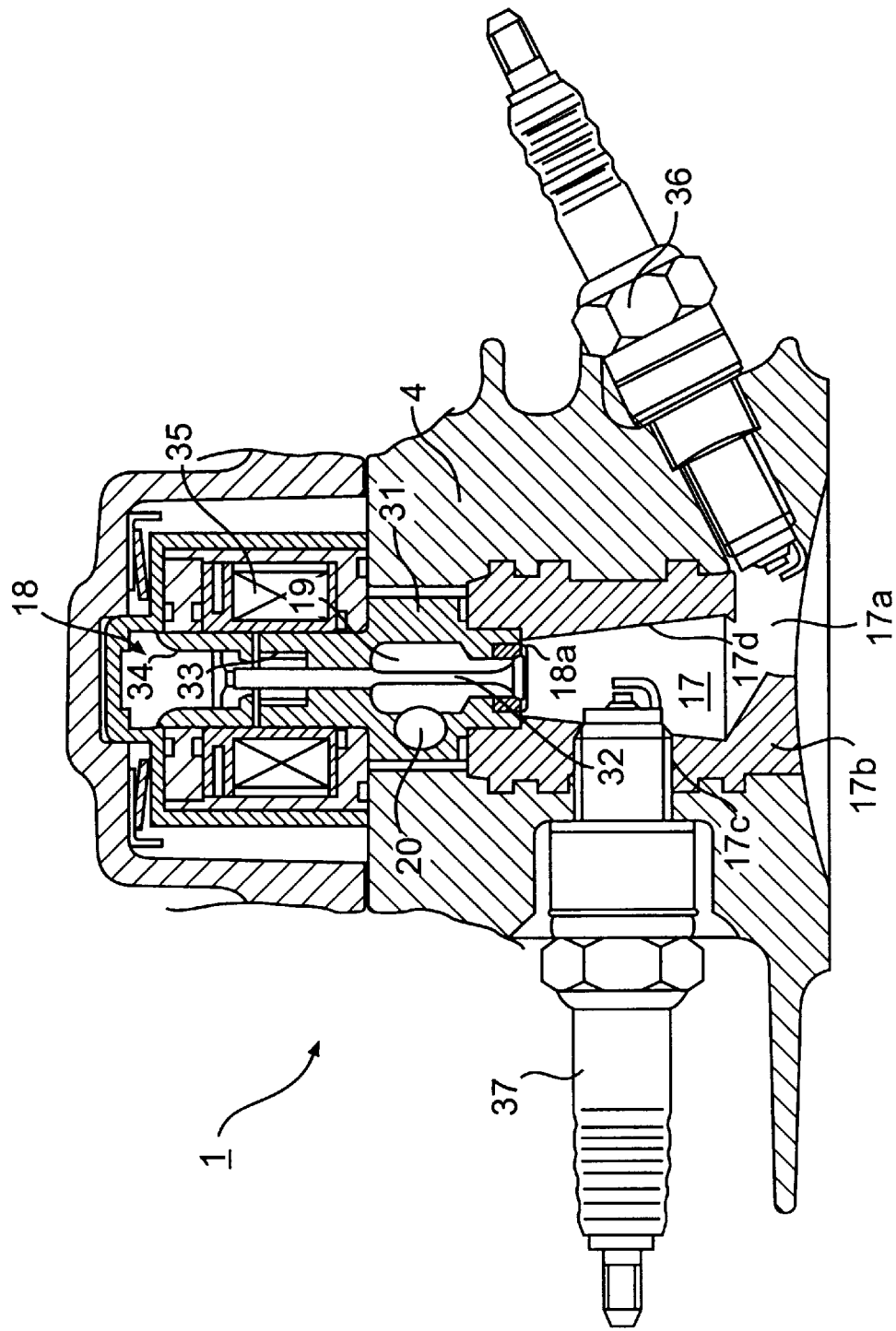
FIG. 4 is a side elevational view in longitudinal section taken along line IV—IV of FIG. 2.

A sub-combustion chamber 17 is located adjacent to a main combustion chamber 16 at the upper part of the cylinder bore 11. The sub-combustion chamber 17 communicates with the main combustion chamber 16, and is made of iron materials such as steel. The sub-combustion chamber 17, as shown in FIG. 4, is formed to be gradually diverged as it approaches the main combustion chamber 16. A communicating opening 17a eccentrically displaced with respect to a center line of the sub-combustion chamber 17 toward a right side as viewed in FIG. 4 so as to be communicated with the main combustion chamber 16. A spark plug 36 is installed at the communicating opening 17a, and a spark plug 37 is arranged at a side opposite to the spark plug 36 at an upstream side in the sub-combustion chamber 17. The spark plugs may be arranged in such a way that the spark plug 37 is directed against the spark plug 36 at a right angle as viewed in FIG. 2.

A striking wall 17b is formed on an extended line of a center line of the sub-combustion chamber 17. The gas mixture injected from a gas mixture injecting solenoid valve 18 strikes against the striking wall 17b so as to change its direction toward the spark plug 36.

The gas mixture injecting solenoid valve 18 is arranged at the top end of the sub-combustion chamber 17. A pressure air passage 20 is fixed to be directed toward the center of the pressure accumulating chamber 19 of the gas mixture injecting solenoid valve 18.

Figure 2:
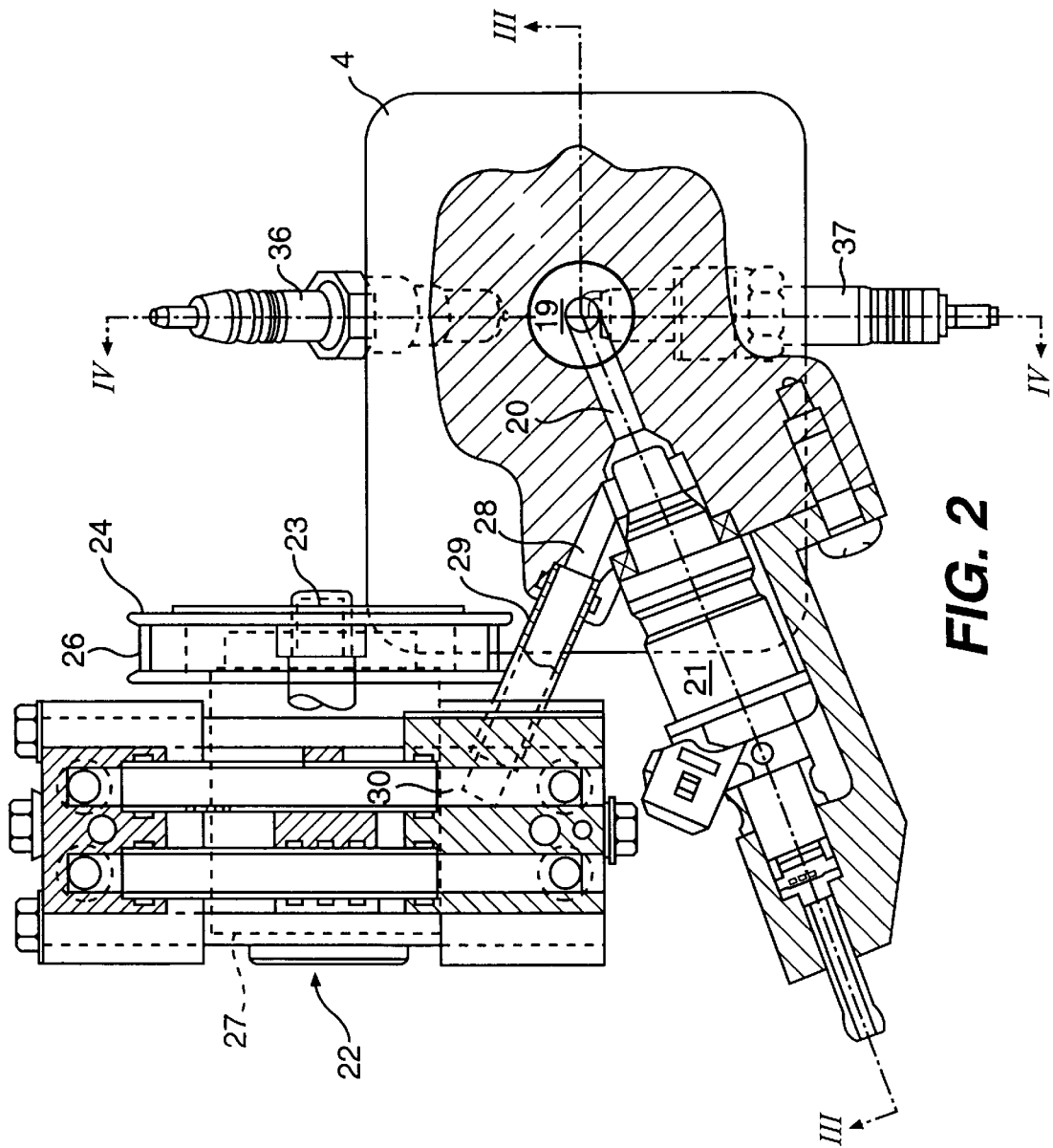
FIG. 2 is a sectional view taken along line II—II of FIG. 1.

As shown in FIG. 2, a reciprocating air pump 22 is fixed to the cylinder head 4. A driven pulley 24 is fitted to a right end of a crankshaft 23 of the reciprocating air pump 22. As shown in FIG. 1, a drive pulley 25 is fitted to the crankshaft 10 of the engine 1. A belt 26 is applied over the driven pulley 24 and the drive pulley 25. As the crankshaft 10 is rotated, the crankshaft 23 of the reciprocating air pump 22 is rotationally driven. A piston (not shown) within the cylinder 27 of the reciprocating air pump 22 is reciprocatingly driven through rotation of the crankshaft 23.

As shown in FIG. 2, the cylinder head 4 is formed with a pressure air passage 28 in a direction crossing at a right angle with the extreme end of a fuel injecting valve 21. One end of a communicating pipe 29 is fitted to the pressure air passage 28 along an extended line of the pressure air passage 28. The other end of the communicating pipe 29 is communicated with a discharging chamber 30 of the reciprocating air pump 22. The pressure air compressed by the reciprocating air pump 22 is supplied from the discharging chamber 30 to the pressure accumulating chamber 19 through the communicating pipe 29, the pressure air passage 28 and the pressure air passage 20. The direct injecting solenoid valve 18 is released and when the fuel injecting valve 21 is operated, fuel is injected from the fuel injecting valve 21 to pressure air flow flowing at the pressure air passage 20 at a high speed toward the pressure accumulating chamber 19. The air and fuel are mixed there, and the gas mixture in the pressure accumulating chamber 19 is forced to flow into the sub-combustion chamber 17 from the releasing part 18a of the direct injecting solenoid valve 18.

The direct injecting solenoid valve 18 is comprised of a valve casing 31, a poppet valve member 32 slidably fitted to the valve casing 31 and capable of opening or closing an opening 18a of the direct injecting solenoid valve 18, a coil spring 33 for biasing the poppet valve member 32 in a direction in which the opening 18a of the direct injecting solenoid valve 18 is closed, a magnetic suction member 34 fitted at one end to a top end of the poppet valve member 32, and a solenoid coil 35 sucking the suction member 34 in a downward direction during its operation to cause the direct injecting solenoid valve 18 to be released. When the solenoid coil 35 is electrically energized to be operated, the direct injecting solenoid valve 18 being kept closed up to now is released.

Figure 5:
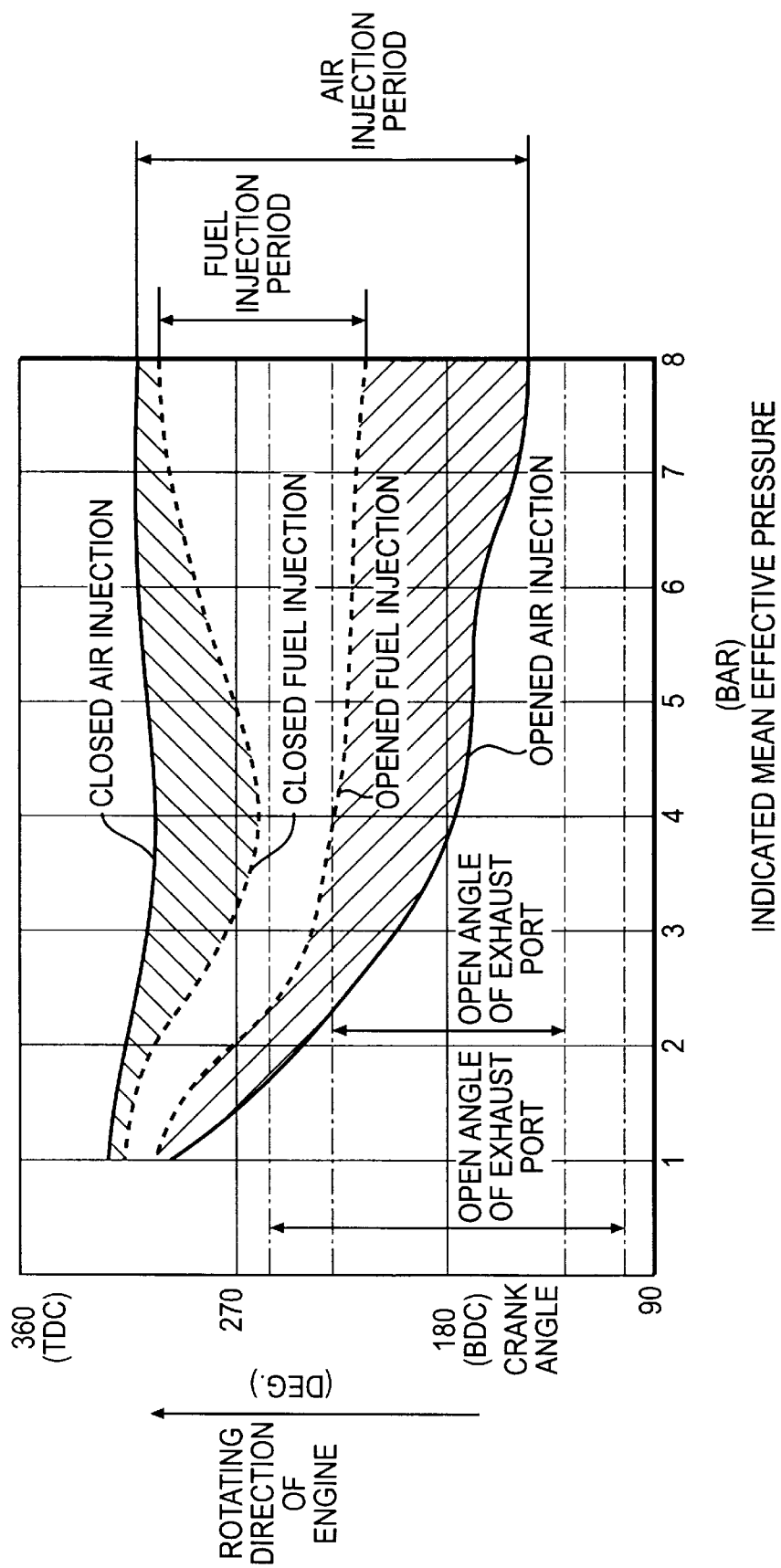
FIG. 5 is a characteristic view showing a pressurized air and a fuel injection timing in the preferred embodiment shown in FIG. 1 in response to a variation of an indicated mean effective pressure.

The gas mixture injecting solenoid valve 18 is opened or closed by a control signal produced from an electronic control device (not shown) at a crank angle timing as shown in FIG. 5 by a solid line in correspondence with an indicated mean effective pressure $PMI=K*W/Ne*Vst$, where W is output, Ne is number of rotation of the engine, Vst is an exhaust amount of the engine, and K is a proportional constant which is one of operation varying amount of the engine 1. The fuel injecting valve 21 performs a starting of injection and a finishing of injection at a crank angle timing shown in FIG. 5 by a dotted line with the control signal from the electronic control device (not shown).

The spark plugs 36, 37 are also operated by an electronic control device (not shown) at a desired timing in correspondence with the indicated mean effective pressure PMI, and a spark is generated concurrently or in an out-of-timing manner.

Since the preferred embodiment shown in FIGS. 1 to 4 is constituted as described above, pressurized air in a pressure accumulating chamber 19 is injected in a radial form into the diverging sub-combustion chamber 17 from the opening 18a of the gas mixture injecting solenoid valve 18 when the gas mixture injecting solenoid valve 18 is opened. Then, after a desired timing, the air becomes a gas mixture together with fuel injected from the fuel injecting valve 21 and is similarly injected in a radial form into the sub-combustion chamber 17.

As a result, a large amount of fuel is not locally adhered to the side wall surfaces 17c, 17d of the sub-combustion chamber 17 so that irregular combustion is prevented and the production of soot is prevented.

The sub-combustion chamber 17 itself has superior thermal retention and further contributes to the prevention of adhesion of fuel due to the fact that the entire main body of the internal combustion engine 1 is made of aluminum alloy and the sub-combustion chamber is made of iron material.

The gas mixture injected into the sub-combustion chamber 17 contacts the electrode of the spark plug 37 in the middle part of it. Thereafter, the gas mixture strikes against the striking wall 17b located on the extended line of the center line of the sub-combustion chamber 17 to change its direction toward the spark plug 36, and the gas then contacts the electrode of the spark plug 36. The result is that the gas mixture in the sub-combustion chamber 17 can be positively ignited.

In addition, the gas mixture injected into the sub-combustion chamber 17 is not injected directly into the main combustion chamber 16, but is stopped by the striking wall 17a and stays there, resulting in that the rich gas mixture and the lean gas mixture overlap in a laminated form at a low load operating range, and laminar combustion may easily be carried out.

In addition, at a high load operating region, the gas mixture ascends vigorously within the main combustion chamber 16 and strikes against the scavenging gas flowing into the sub-combustion chamber 17 to cause the gas mixture and the scavenging gas to be uniformly mixed with each other. Concurrently, the gas mixture flow striking against the striking wall 17b in the sub-combustion chamber 17 and flowing toward the spark plug 36 and the upward directing scavenging gas flow may generate eddy flow to cause both of them to be uniformly mixed with each other. In this way, a relative rich supplied gas can be ignited sufficiently.

Figure 6:
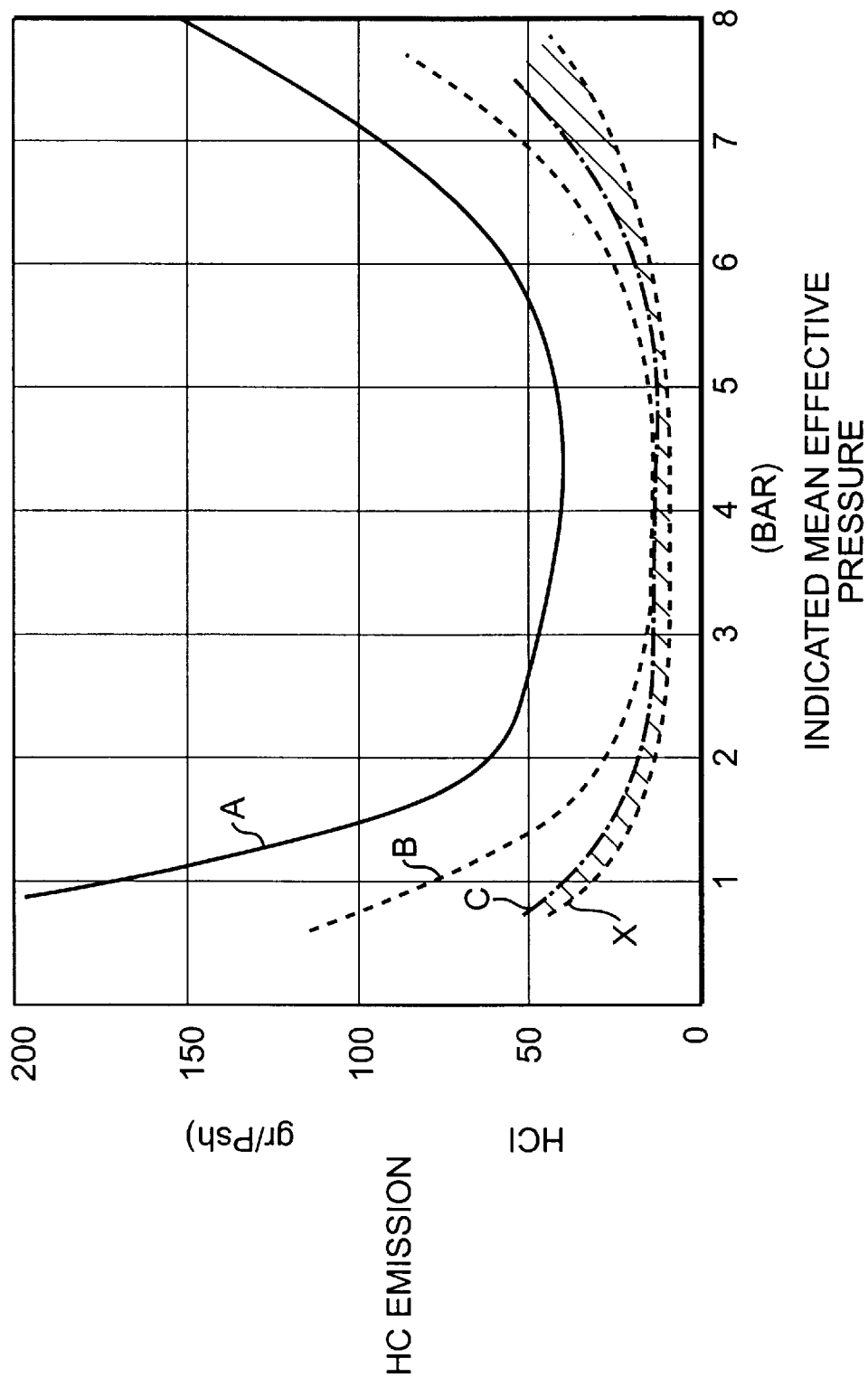
FIG. 6 is a characteristic view showing a hydrogen carbide discharging force in the preferred embodiment shown in FIG. 1 and a hydrogen carbide discharging amount in the prior art internal combustion engine in reference to a variation of an indicated mean effective pressure.
Figure 7:
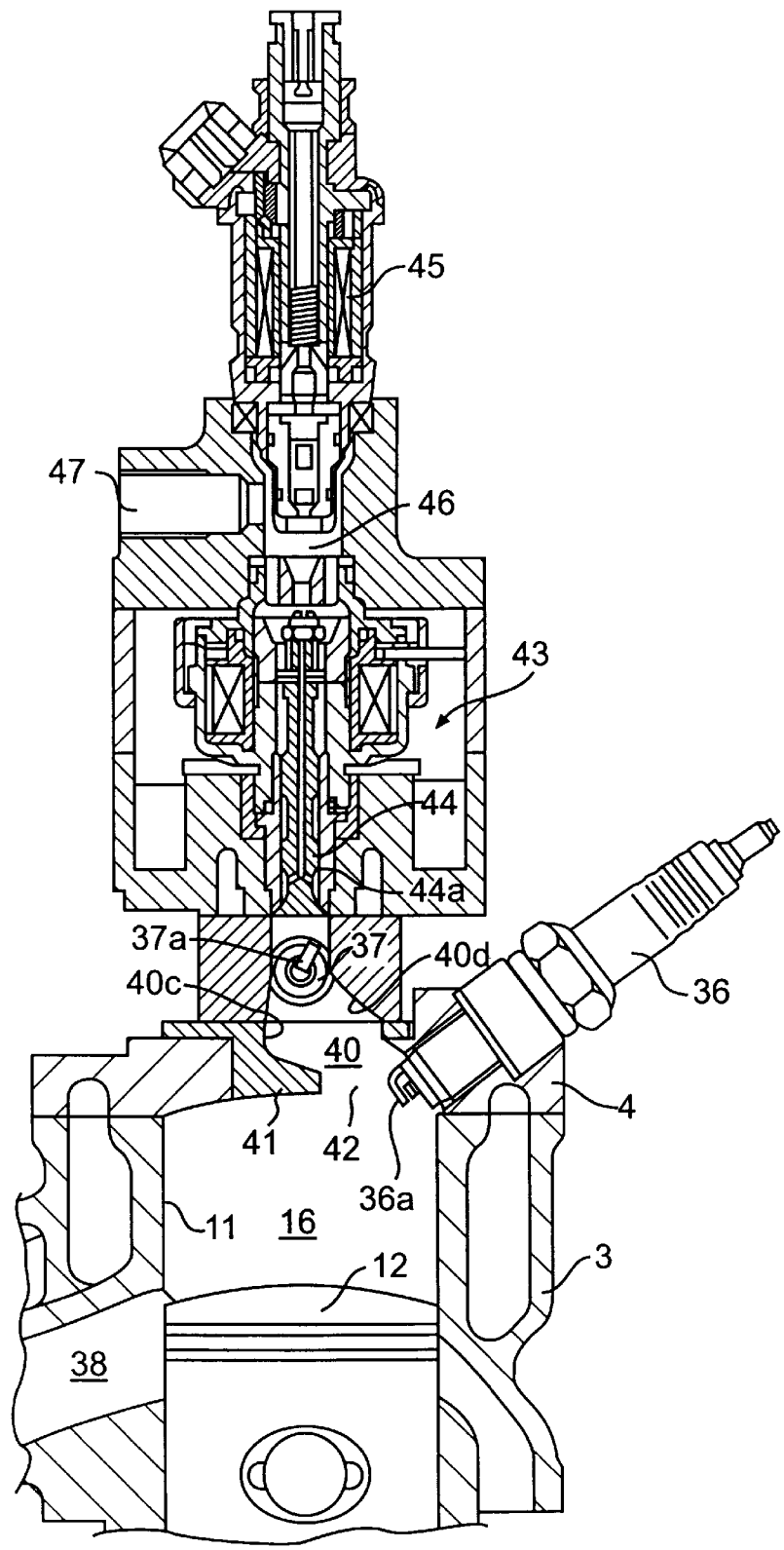
FIG. 7 is a side elevational view in longitudinal section showing another preferred embodiment of the present invention.
Figure 8:
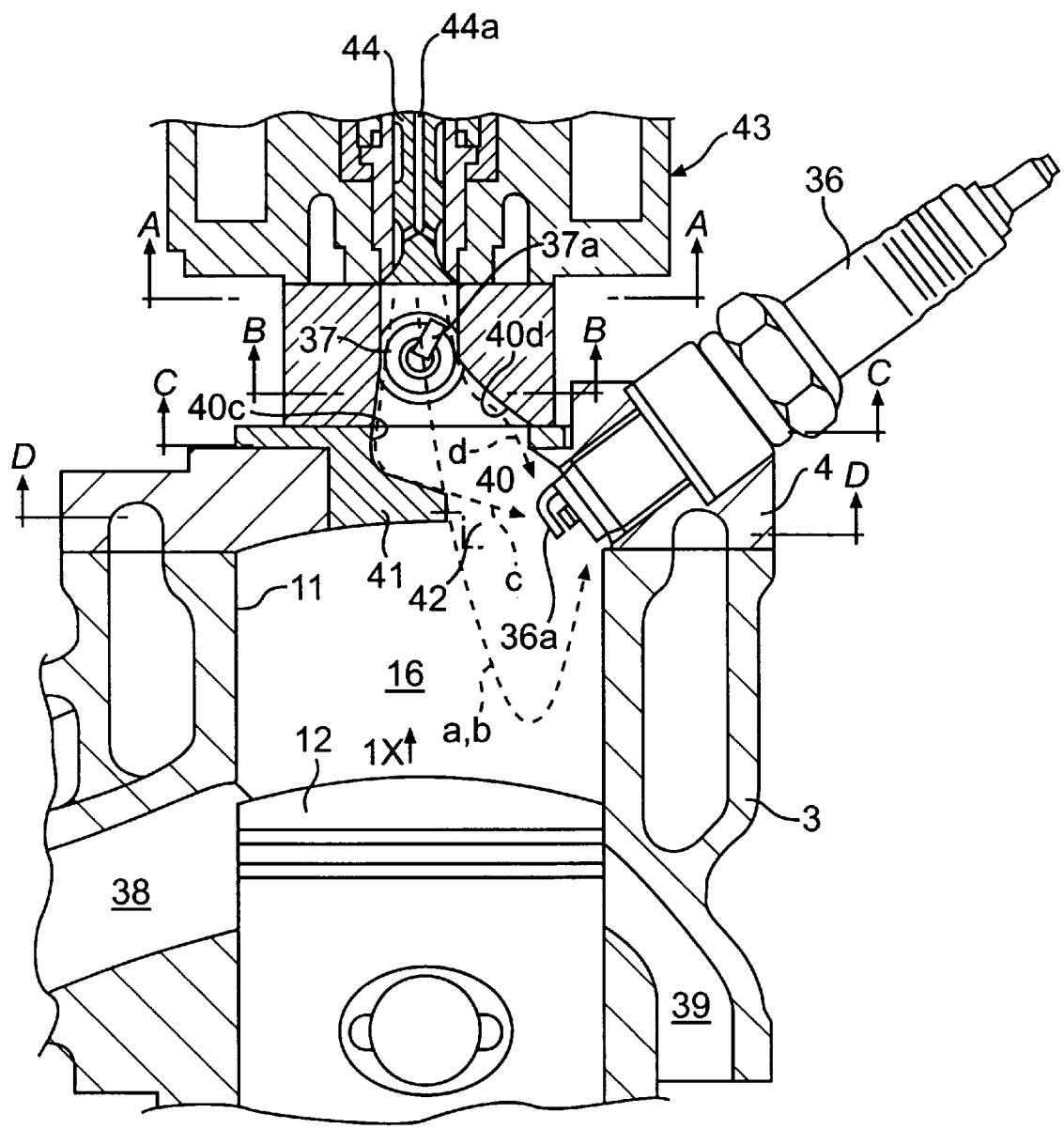
FIG. 8 is an enlarged side elevational view in longitudinal section showing a substantial part shown in FIG. 7.

As shown at X in FIG. 6, a discharging amount of hydrogen carbide is reduced as compared with a discharging amount of hydrogen carbide of the prior art internal combustion engine A, an internal combustion engine B having no sub-combustion chamber and an internal combustion engine C having a sub-combustion chamber.

As shown in FIGS. 2 and 3, an exhaust port 38 is provided at a side opposite to a side where the communicating opening 17a of the sub-combustion chamber 17 is arranged (a right side in FIG. 4). Therefore, the gas mixture flowing from the sub-combustion chamber 17 into the main combustion chamber 16 through the communicating opening 17a cannot directly reach the exhaust port 38, and blowing-off of the gas can be sufficiently avoided.

A scavenging port 39 is arranged at a side opposite to the exhaust port 38, and additional scavenging ports 39 are provided on both right and left sides of the exhaust port.

Since a pressure within the pressure accumulating chamber 19 is increased by the reciprocating air pump 22 more than a pressure in the sub-combustion chamber 17, air can be injected vigorously from within the pressure accumulating chamber 19 into the sub-combustion chamber 17.

Referring now to FIGS. 7 to 11, another preferred embodiment of the present invention will be described.

In the preferred embodiment shown in FIGS. 7 to 11, a shape of the sub-combustion chamber 40 is formed to be more smoothly in a diverging shape than that of the sub-combustion chamber 17 of the preferred embodiment shown in FIGS. 1 to 4.

Although both side wall surfaces 40a, 40b of the sub-combustion chamber 40 are formed in a symmetrical shape, the front wall surface 40c of the sub-combustion chamber 40 is steeply inclined with respect to a center line of the cylinder bore 11. A striking wall 41 is projected at the lower edge of the outer front wall surface 40c toward the electrode 36a of the rearward spark plug 36. A communicating opening for communicating between the sub-combustion chamber 40 and the main combustion chamber 16 is positioned near the spark plug 36. A practical cross sectional shape of the sub-combustion chamber 40 is formed as shown in FIG. 10. The shape at the upper part of the sub-combustion chamber 40 is conical. The right and left wall surfaces 40a, 40b and the rear wall surface 40d become pyramidal surfaces as they advance downwardly and only the front wall surface 40c keeps its conical surface.

Figure 9:
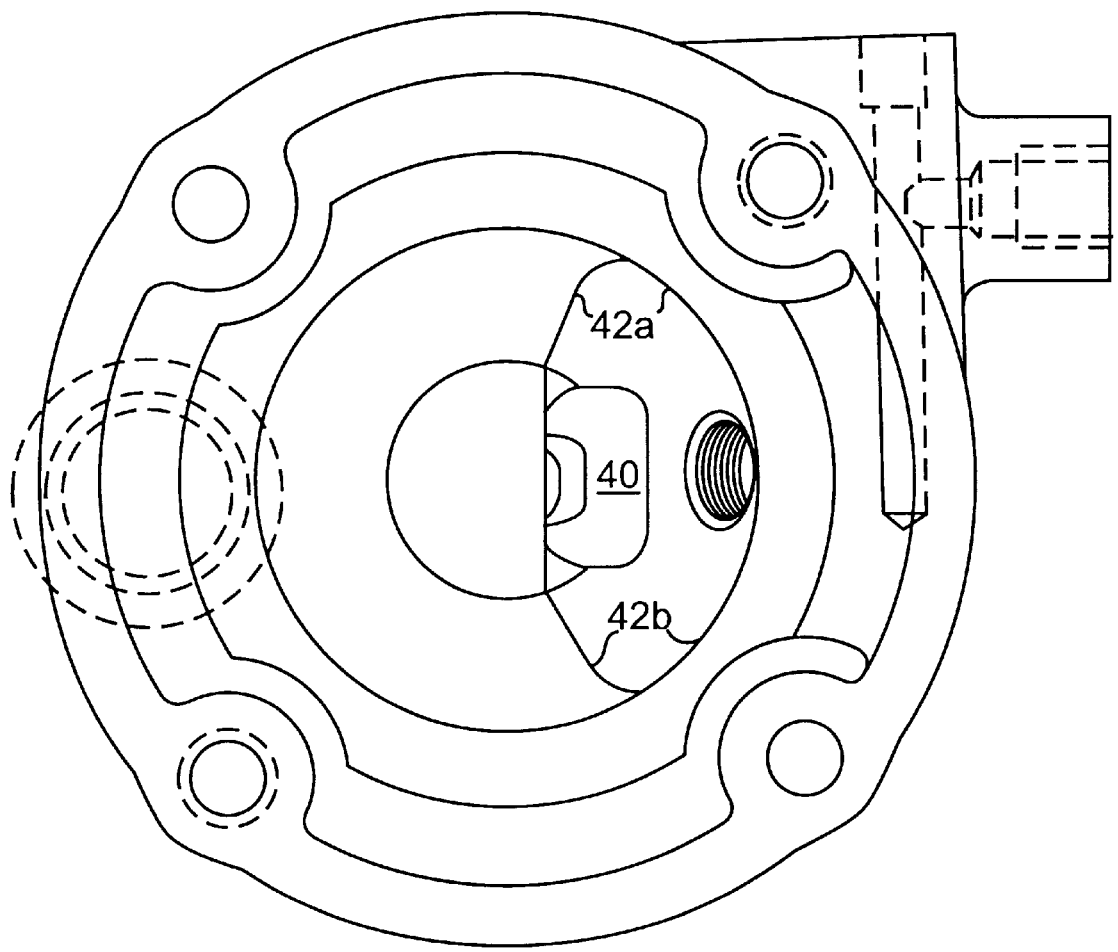
FIG. 9 is a view as seen at an arrow IX in FIG. 8.
Figure 10A:
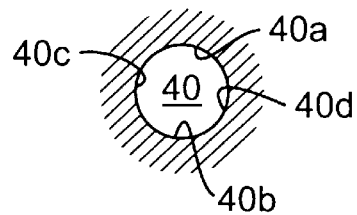
FIGS. 10(A)–(D) are sectional views taken along each of a line A—A, a line B—B, a line C—C and a line D—D in FIG. 8, respectively.
Figure 10B:
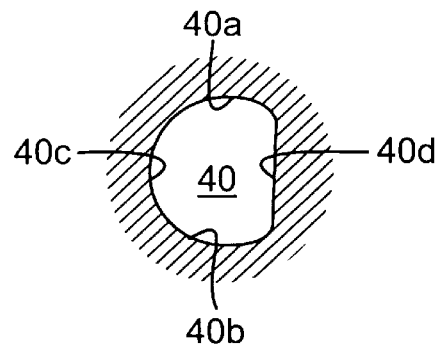
Figure 10C:
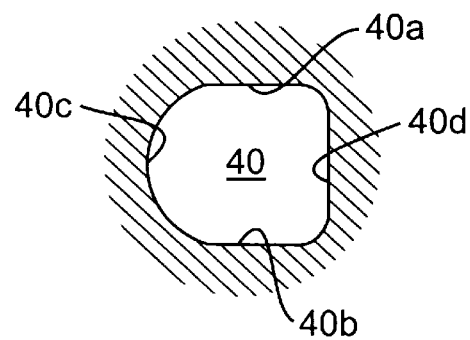
Figure 10D:
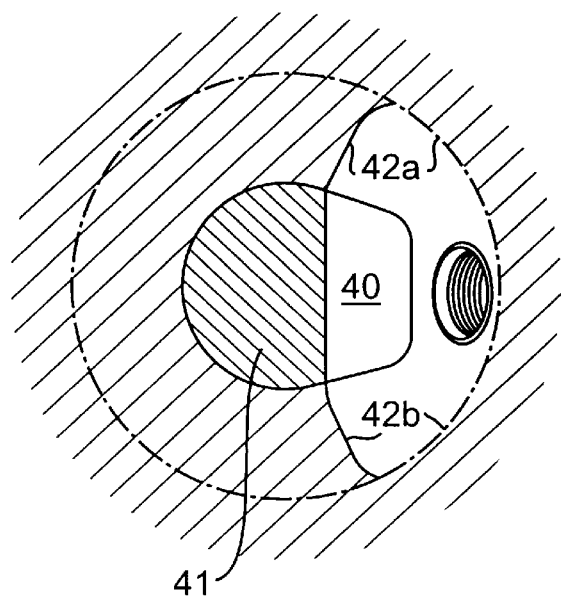
Figure 11:
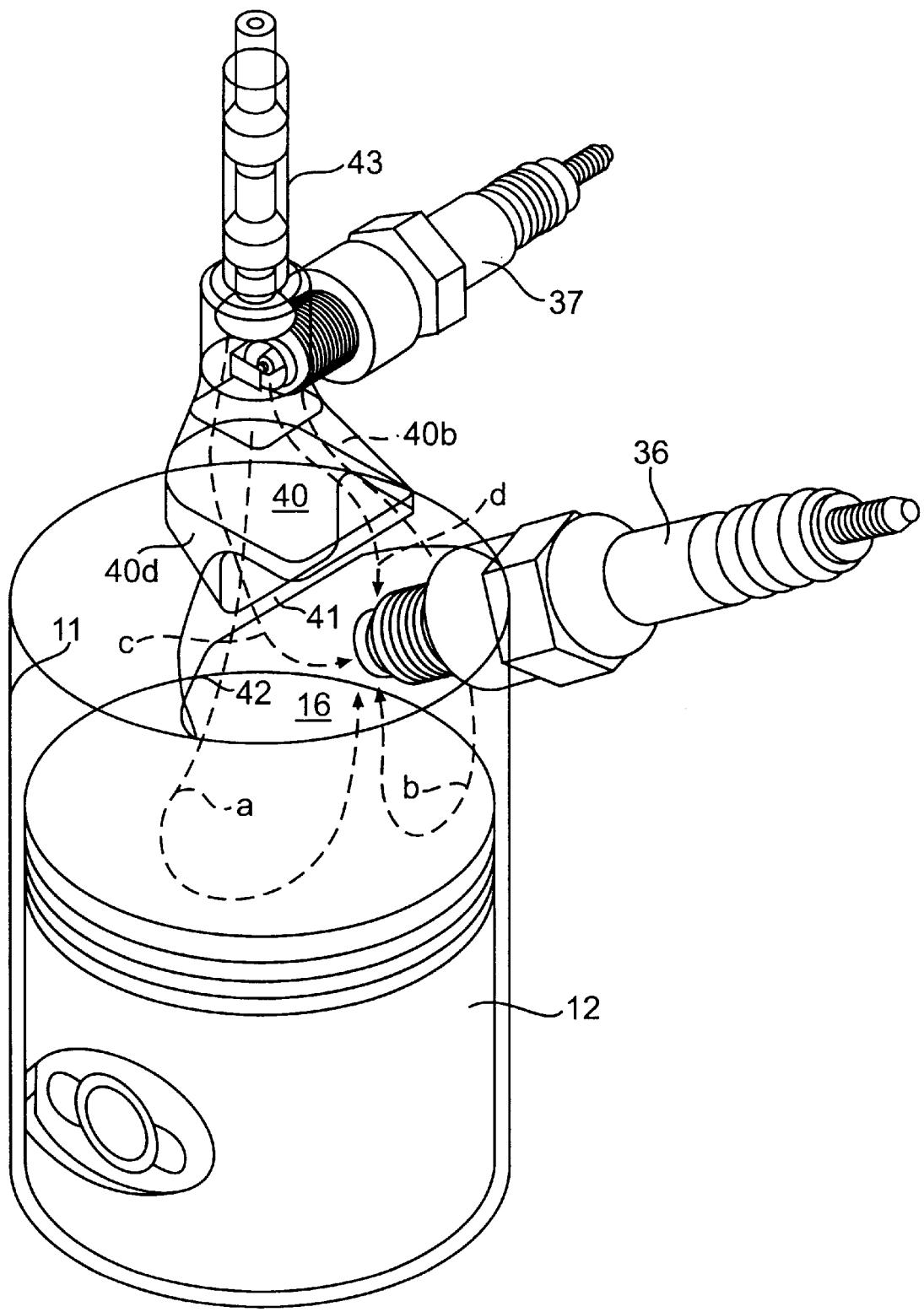
FIG. 11 is a perspective view showing a substantial part shown in FIG. 8.

In addition, both right and left sides 42a, 42b of the communicating opening 42 are projected further outwardly from the striking wall 41 as shown in FIGS. 9 and 10. The communicating opening 42 is formed in a substantially elongated circle. Gas flow in either the pressurized air or gas mixture injected from the gas mixture injecting solenoid valve 43 flows along both side wall surfaces 40a, 40b of the sub-combustion chamber 40 along broken lines (a) and (b) of FIG. 11. The gas flow along the front wall surface 40c of the sub-combustion chamber 40 flows along a broken line (c), and the gas flow along the rear wall surface 40d of the sub-combustion chamber 40 flows along the broken line (d).

The gas mixture injecting solenoid valve 43 has a structure which is basically similar to that of the gas mixture injecting solenoid valve 18. The gas mixture injecting solenoid valve 43 is arranged along a center line of the cylinder bore 11 above the sub-combustion chamber 40. The extreme end of the pressure air passage 47 is opened at the pressure accumulating chamber 46 which communicates the gas mixture injecting solenoid valve 43 with the fuel injecting valve 45. The base end of the pressure air passage 47 is connected to a pressurizing air pump through a connecting pipe and a surge tank (not shown). Pressurized air of constant pressure is always present within the pressure accumulating chamber 46. The fuel injecting valve 45 is operated during a released state of the gas mixture injecting solenoid valve 43 so as to inject fuel.

The spark plug 36 is arranged at the rear wall surface 40d of the sub-combustion chamber 40, and the spark plug 37 is arranged at the right side wall surface 40b of the sub-combustion chamber 40.

The preferred embodiment shown in FIGS. 7 to 11 is provided with the striking wall 41 in the same manner as that of the preferred embodiment shown in FIGS. 1 to 4. Under a low load operating state, the gas mixture injected into the sub-combustion chamber 40 is formed into a laminated form with gas mixtures of different concentrations, and stable stratified charge combustion is carried out.

In addition, since the communicating opening 42 is displaced eccentrically from the center line of each of the main combustion chamber 16 and the gas mixture injecting solenoid valve 43 toward the spark plug 36, almost of all the gas mixture injected from the gas mixture injecting solenoid valve 43 flows through (c) and (d), contacting the electrode 36a of the spark plug 36. The gas mixture injected from the gas mixture injecting solenoid valve 43 flows along the right and left wall surfaces 40a, 40b and along the right and left side surfaces of the cylinder bore 11 to a downward side of the main combustion chamber 16. The flow then reverses at the top surface of the piston 12, and ascends to reach the electrode 36a of the spark plug 36. The gas mixture flowing along the right side wall surface 40b contacts the electrode 37a of the spark plug 37, resulting in that ignitable gas mixture near the electrodes 36a, 37a of the spark plugs 36, 37 is present and stable stratified charge combustion becomes possible.

Further, since the communicating opening 42 is formed at right and left sides in an elongated circular shape, the gas mixture flow along the right and left wall surfaces 40a, 40b of the sub-combustion chamber 40 does not strike against the striking wall 41, but reach to the downward part in the main combustion chamber 16 along the right and left side surfaces of the cylinder bore 11, and is reversed at the top surface of the piston 12 to generate eddy flow in a longitudinal direction and to perform a sufficient replacement of gas.

In addition, the gas mixture injected from the gas mixture injecting solenoid valve 43 flows toward the spark plug 36 and does not flow toward the exhaust port 38, resulting in that the blowing-off of the gas is sufficiently avoided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A spark ignition internal combustion engine comprising:

a sub-combustion chamber communicated with a main combustion chamber;

a gas mixture injecting device for directly and intermittently injecting gas mixture into said sub-combustion chamber; and an igniting device arranged in said sub-combustion chamber, wherein said sub-combustion chamber is communicated with said main combustion chamber eccentrically displaced from an extended line of an injecting direction of said gas mixture injecting device, and wherein said sub-combustion chamber is formed in a diverging shape in a slant non-symmetrical angle toward said main combustion chamber along an injection extended line of said fuel injecting device, a striking wall is projected from a downstream edge of a gradual slant side surface of said sub-combustion chamber gradually slanted against the injection extended line of said fuel injecting device along a downstream edge of a steep slant side surface of said sub-combustion chamber inclined in a steep state, and an igniting means is arranged at said steep side surface of the sub-combustion chamber.

2. The spark ignition internal combustion engine according to claim 1, wherein said gas mixture injecting device comprises:

a pressure accumulating chamber adjacent to said sub-combustion chamber and in which pressurized air is filled;

a valve for communicating said pressure accumulating chamber with said sub-combustion chamber; and a fuel injecting valve for injecting fuel to said pressure accumulating chamber.

3. The spark ignition internal combustion engine according to claim 2, wherein said valve is a poppet valve.

4. The spark ignition internal combustion engine according to claim 1, wherein said internal combustion engine is a 2-cycle internal combustion engine.

5. A spark ignition internal combustion engine comprising:

a sub-combustion chamber communicated with a main combustion chamber;

a gas mixture injecting device for directly and intermittently injecting gas mixture into said sub-combustion chamber, said gas mixture injecting device comprising:

a pressure accumulating chamber adjacent to said sub-combustion chamber and in which pressurized air is filled;

a valve for communicating said pressure accumulating chamber with said sub-combustion chamber; and a fuel injecting valve for injecting fuel to said pressure accumulating chamber; and an igniting device arranged in said sub-combustion chamber, wherein said sub-combustion chamber is communicated with said main combustion chamber eccentrically displaced from an extended line of an injecting direction of said gas mixture injecting device, and wherein said valve and said sub-combustion chamber are arranged in series in one linear line, a striking wall is formed from a side surface of the sub-combustion chamber toward an eccentric communicating opening between said main combustion chamber and said sub-combustion chamber, and an additional igniting device is arranged at a sub-combustion side surface of said eccentric communicating opening.

6. The spark ignition internal combustion engine according to claim 5, wherein a side surface in said sub-combustion chamber near said eccentric communicating opening is inclined at a large angle with respect to an arranging direction of said valve and said sub-combustion chamber, and an opposed surface of said sub-combustion chamber at a side surface near the eccentric communicating opening is inclined at a small angle with respect to said arranging direction.

7. The spark ignition internal combustion engine according to claim 6, wherein the communicating opening between said main combustion chamber and the sub-combustion chamber is formed in a laterally elongated shape in a direction crossing at a right angle with respect to a slant direction of gradual and steep slant side surfaces of said sub-combustion chamber, the top surface of said main combustion chamber is projected out of said communicating opening toward said lateral elongated direction, a part of gas mixture injected from said sub-combustion chamber to said main combustion chamber through said communicating opening becomes an eddy flow toward a center line of the cylinder bore.

8. The spark ignition internal combustion engine according to claim 7, wherein the communicating opening between said main combustion chamber and the sub-combustion chamber is formed in a laterally elongated shape in a direction crossing at a right angle with respect to a slant direction of gradual and steep slant side surfaces of said sub-combustion chamber, the top surface of said main combustion chamber is projected out of said communicating opening toward said lateral elongated direction, a part of gas mixture injected from said sub-combustion chamber to said main combustion chamber through said communicating opening becomes an eddy flow toward a center line of the cylinder bore.

9. A spark ignition internal combustion engine comprising:

a sub-combustion chamber communicated with a main combustion chamber;

a gas mixture injecting device for directly and intermittently injecting gas mixture into said sub-combustion chamber, said gas mixture injecting device comprising:

a pressure accumulating chamber adjacent to said sub-combustion chamber and in which pressurized air is filled;

a poppet valve for communicating said pressure accumulating chamber with said sub-combustion chamber; and a fuel injecting valve for injecting fuel to said pressure accumulating chamber; and an igniting device arranged in said sub-combustion chamber, wherein said sub-combustion chamber is communicated with said main combustion chamber eccentrically displaced from an extended line of an injecting direction of said gas mixture injecting device, and wherein said sub-combustion chamber is elongated in a diverging shape in at least one longitudinal section along a central extended axis line of said poppet valve.

10. An internal combustion engine comprising:

a cylinder block having a cylinder bore therein, said cylinder bore comprising a main combustion chamber;

a cylinder head attached to said cylinder block, said cylinder head including a sub-combustion chamber therein adjacent to said main combustion chamber, a gas mixture injecting device arranged in said cylinder head for injecting a gas mixture into said sub-combustion chamber;

a first igniter arranged in said sub-combustion chamber for igniting said gas mixture in said sub-combustion chamber; and a second igniter arranged in said sub-combustion chamber for igniting said gas mixture in said sub-combustion chamber, wherein said sub-combustion chamber and said main combustion chamber are interconnected by an opening laterally displaced from a center line extending through said gas mixture injecting device.

11. The internal combustion engine according to claim 10, wherein said gas mixture injecting device comprises:

a pressure accumulating chamber located adjacent to said sub-combustion chamber for receiving a quantity of pressurized air;

a fuel injecting valve for injecting fuel into said pressure accumulating chamber; and a valve for communicating said pressure accumulating chamber with said sub-combustion chamber.

12. The internal combustion engine according to claim 10, wherein said gas mixture injecting device is located at one end of said sub-combustion chamber, and a striking wall projects from a side surface of the sub-combustion chamber toward said opening between said main combustion chamber and said sub-combustion chamber.

13. An internal combustion engine comprising:

a cylinder block having a cylinder bore therein, said cylinder bore comprising a main combustion chamber;

a cylinder head attached to said cylinder block, said cylinder head including a sub-combustion chamber therein adjacent to said main combustion chamber, a gas mixture injecting device arranged in said cylinder head for injecting a gas mixture into said sub-combustion chamber, said gas mixture injecting device comprising:

a pressure accumulating chamber located adjacent to said sub-combustion chamber for receiving a quantity of pressurized air;

a fuel injecting valve for injecting fuel into said pressure accumulating chamber; and a valve for communicating said pressure accumulating chamber with said sub-combustion chamber; and a first igniter arranged in said sub-combustion chamber for igniting said gas mixture in said sub-combustion chamber, wherein said sub-combustion chamber and said main combustion chamber are interconnected by an opening laterally displaced from a center line extending through said gas mixture injecting device, and wherein said valve is reciprocatable along said center line extending through said gas mixture injecting device.

14. An internal combustion engine comprising:

a cylinder block having a cylinder bore therein, said cylinder bore comprising a main combustion chamber;

a cylinder head attached to said cylinder block, said cylinder head including a sub-combustion chamber therein adjacent to said main combustion chamber, a gas mixture injecting device arranged in said cylinder head for injecting a gas mixture into said sub-combustion chamber;

a first igniter arranged in said sub-combustion chamber for igniting said gas mixture in said sub-combustion chamber;

a striking wall projecting from a side surface of the sub-combustion chamber toward said opening between said main combustion chamber and said sub-combustion chamber; and a second igniter arranged in said sub-combustion chamber for igniting said gas mixture in said sub-combustion chamber, wherein said sub-combustion chamber and said main combustion chamber are interconnected by an opening laterally displaced from a center line extending through said gas mixture injecting device, and wherein said first igniter is located in said side surface above said striking wall, and said second igniter is located adjacent said opening between said main combustion chamber and said sub-combustion chamber.

15. A cylinder head for an internal combustion engine comprising:

a sub-combustion chamber having an upper aperture and a lower aperture;

said sub-combustion chamber having a longitudinal axis extending therethrough and centrally through said upper aperture;

said upper aperture for receiving a gas mixture injecting device from which a gas mixture is injected into said sub-combustion chamber; and said lower aperture being eccentrically located with respect to said longitudinal axis, wherein said sub-combustion chamber is formed in a diverging shape in a slant non-symmetrical angle along an injection extended line of said gas mixture injecting device, a striking wall is projected from a downstream edge of a gradual slant side surface of said sub-combustion chamber gradually slanted against the injection extended line of said gas mixture injecting device along a downstream edge of a steep slant side surface of said sub-combustion chamber inclined in a steep state, and an igniting means is arranged at said steep side surface of the sub-combustion chamber.

16. The cylinder head according to claim 15, further comprising a striking wall projecting from a side wall of the sub-combustion chamber toward said lower aperture, wherein said striking wall extends from said side wall approximately to said longitudinal axis.

17. The cylinder head according to claim 15, wherein said sub-combustion chamber comprises an insert located within said cylinder head.

18. The cylinder head according to claim 17, wherein said cylinder head is made at least partially of aluminum, and said insert forming said sub-combustion chamber is made at least partially of iron.

* * * * *